(12) United States Patent
Kondo et al.

(10) Patent No.: US 7,918,128 B2
(45) Date of Patent: Apr. 5, 2011

(54) FUEL INJECTOR WITH ELECTRIC SHIELD

(75) Inventors: Jun Kondo, Nagoya (JP); Tooru Taguchi, Handa (JP); Fumiaki Arikawa, Okazaki (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 357 days.

(21) Appl. No.: 12/265,745

(22) Filed: Nov. 6, 2008

(65) Prior Publication Data

US 2009/0118982 A1 May 7, 2009

(30) Foreign Application Priority Data

Nov. 6, 2007 (JP) ................................ 2007-289076

(51) Int. Cl.
*G01M 15/00* (2006.01)
(52) U.S. Cl. .................................. 73/114.43; 73/114.51
(58) Field of Classification Search .................. 123/494; 73/114.43, 114.45, 114.51
See application file for complete search history.

(56) References Cited

U.S. PATENT DOCUMENTS

| | | | |
|---|---|---|---|
| 4,438,496 A | 3/1984 | Ohie | |
| 4,711,396 A | 12/1987 | Lange | |
| 5,834,638 A | 11/1998 | Taylor et al. | |
| 6,565,020 B1 | 5/2003 | Fischer et al. | |
| 6,622,549 B1 | 9/2003 | Wlodarczyk et al. | |
| 7,216,630 B2 | 5/2007 | Martin et al. | |
| 7,313,969 B2 * | 1/2008 | Suzuki | 73/756 |
| 2006/0053896 A1 * | 3/2006 | Suzuki | 73/756 |
| 2007/0252431 A1 * | 11/2007 | Tsunooka et al. | 303/119.3 |
| 2008/0228374 A1 | 9/2008 | Ishizuka et al. | |

FOREIGN PATENT DOCUMENTS

| | | |
|---|---|---|
| EP | 1 321 660 | 6/2003 |
| JP | 57-005526 | 1/1982 |
| JP | 2000-265892 | 9/2000 |
| JP | 2008-144749 | 6/2008 |

OTHER PUBLICATIONS

Extended European Search Report dated Mar. 4, 2009, issued in corresponding European Application No. 08168396.3-2311.

* cited by examiner

*Primary Examiner* — Thomas N Moulis
(74) *Attorney, Agent, or Firm* — Nixon & Vanderhye, PC (57) ABSTRACT

A fuel injector for an internal combustion engine is provided. The fuel injector is equipped with a fuel pressure sensor, a sensor circuit such as an amplifier, and a valve actuator such as a piezoelectric actuator. The fuel injector also includes a conductive shield which is disposed between the sensor circuit and actuator drive terminals to supply electric power to the actuator and works to shield the sensor circuit from electric noises arising from the drive terminals, thereby minimizing the addition of the noises to an output of the fuel pressure sensor, as being processed in the sensor circuit, and ensuring the accuracy in determining the pressure of fuel based on the output of the fuel pressure sensor.

6 Claims, 6 Drawing Sheets

FUEL INJECTOR WITH ELECTRIC SHIELD

CROSS REFERENCE TO RELATED DOCUMENT

The present application claims the benefit of Japanese Patent Application No. 2007-289076 filed on Nov. 6, 2007, the disclosure of which is incorporated herein by reference.

BACKGROUND OF THE INVENTION

1. Technical Field of the Invention

The present invention relates generally to a fuel injector to be installed in an internal combustion engine to spray fuel thereinto, and more particularly to such a fuel injector which has installed therein a fuel pressure sensor, a sensor circuit, and an electric shield which works to shield the sensor circuit from electric noises arising from drive terminals which are used to control an operation of the fuel pressure sensor.

2. Background Art

In order to ensure the accuracy in controlling output torque of internal combustion engines and the quantity of exhaust emissions therefrom, it is essential to control a fuel injection mode such as the quantity of fuel to be sprayed from a fuel injector or the injection timing at which the fuel injector starts to spray the fuel. For controlling such a fuel injection mode, there have been proposed techniques for monitoring a change in pressure of the fuel upon spraying thereof from the fuel injector.

Specifically, the time when the pressure of the fuel begins to drop due to the spraying thereof from the fuel injector may be used to determine an actual injection timing at which the fuel has been sprayed actually. The amount of drop in pressure of the fuel arising from the spraying thereof may be used to determine the quantity of fuel actually sprayed from the fuel injector. Such actual observation of the fuel injection mode ensures the desired accuracy in controlling the fuel injection mode.

For instance, in the case where a change in pressure of the fuel arising from the spraying of the fuel from the fuel injector (which will also be referred to as a fuel pressure change below) is measured using a pressure sensor installed directly in a common rail (i.e., a fuel accumulator), it will be somewhat absorbed within the common rail, thus resulting in a decrease in accuracy in determining such a fuel pressure change. In order to alleviate this drawback, Japanese Patent First Publication No. 2000-265892 teaches installation of the pressure sensor in a joint between the common rail and a high-pressure pipe through which the fuel is delivered from the common rail to the fuel injector to measure the fuel pressure change before it is absorbed within the common rail.

The fuel pressure change, as produced at a spray hole of the fuel injector through which the fuel has been sprayed, will, however, surely attenuate within the high-pressure pipe. The use of the pressure sensor installed in the joint between the common rail and the high-pressure pipe, therefore, does not ensure the desired accuracy in determining the fuel pressure change. The inventors have study the installation of the pressure sensor in a portion of the fuel injector which is located downstream of the high-pressure pipe. Such installation, however, has been found to pose the problem, as discussed below.

The pressure sensor is typically made up of a body in which a high-pressure path is formed to supply high-pressure fuel to a spray hole, a valve actuator installed in the body to move a valve to open or close the spray hole, drive terminals to supply electric power to the valve actuator. The power is supplied or blocked to the valve actuator to turn on or off frequently, so that the drive terminals will radiate electric noises. The fuel pressure sensor also has installed therein an amplifier working to amplify an output thereof, which will be, however, exposed undesirably to the noises arising from the drive terminals.

SUMMARY OF THE INVENTION

It is therefore a principal object of the invention to avoid the disadvantages of the prior art.

It is another object of the invention to provide a fuel injector for an internal combustion engine which may be employed in automotive diesel common rail injection system and which is equipped with a fuel pressure sensor, a circuit component for the fuel pressure sensor, an electric shield to shield the circuit component from electric noises to ensure the accuracy in measuring the pressure of fuel using an output of the fuel pressure sensor.

According to one aspect of the invention, there is provided a fuel injector for an internal combustion engine such as an automotive diesel engines. The fuel injector comprises: (a) a body in which a fuel flow path is formed which extends from a fuel inlet to a spray hole; (b) an actuator disposed within the body, the actuator working to open the spray hole to spray fuel, as supplied to the fuel flow path through the fuel inlet, to an internal combustion engine; (c) a fuel pressure sensor installed in the body, the fuel pressure sensor working to measure a pressure of the fuel in the fuel flow path and produce an electric signal indicative thereof; (d) a circuit component serving as an amplifier to amplify the electric signal, as produced by the fuel pressure sensor, to output the amplified electric signal; (e) drive terminals connected to the actuator to supply electric power to the actuator; and (f) a conductive shield disposed between the drive terminals and the circuit component to shield the circuit component from electric noise arising from the drive terminals.

Specifically, the conductive shield works to block the transmission of the noise from the drive terminals to the circuit component, thus minimizing the addition of the noise to the output of the fuel pressure sensor, as being processed in the circuit component, and ensuring the accuracy in determining the pressure of the fuel.

In the preferred mode of the invention, the body is metallic. The conductive shield is grounded to the body, thereby ensuring the ability of the conductive shield.

The fuel pressure sensor includes a deformable member and a sensing device. The deformable member deforms elastically when subjected to the pressure of the fuel. The sensing device works to produce the electric signal as a function of an amount of deformation of the deformable member. The conductive shield is disposed between the drive terminals and the sensor device and includes a sensor device shield working to block the electric noise, as radiated from the drive terminals to the sensor device.

The fuel injector further comprises a sensor terminal connected to the circuit component to output the amplified electric signal. The conductive shield is disposed between the drive terminals and the sensor terminal to have a sensor terminal shield working to block the electric noise, as radiated from the drive terminals to the sensor terminal.

The conductive shield and the drive terminals are united by a resin mold. This facilitates the installation of the conductive shield in the fuel injector.

The fuel injector further comprise a connector housing which retains the drive terminals. The conductive shield is retained by the connector housing along with the drive terminals, thus eliminating the need for an additional holder to hold the conductive shield.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
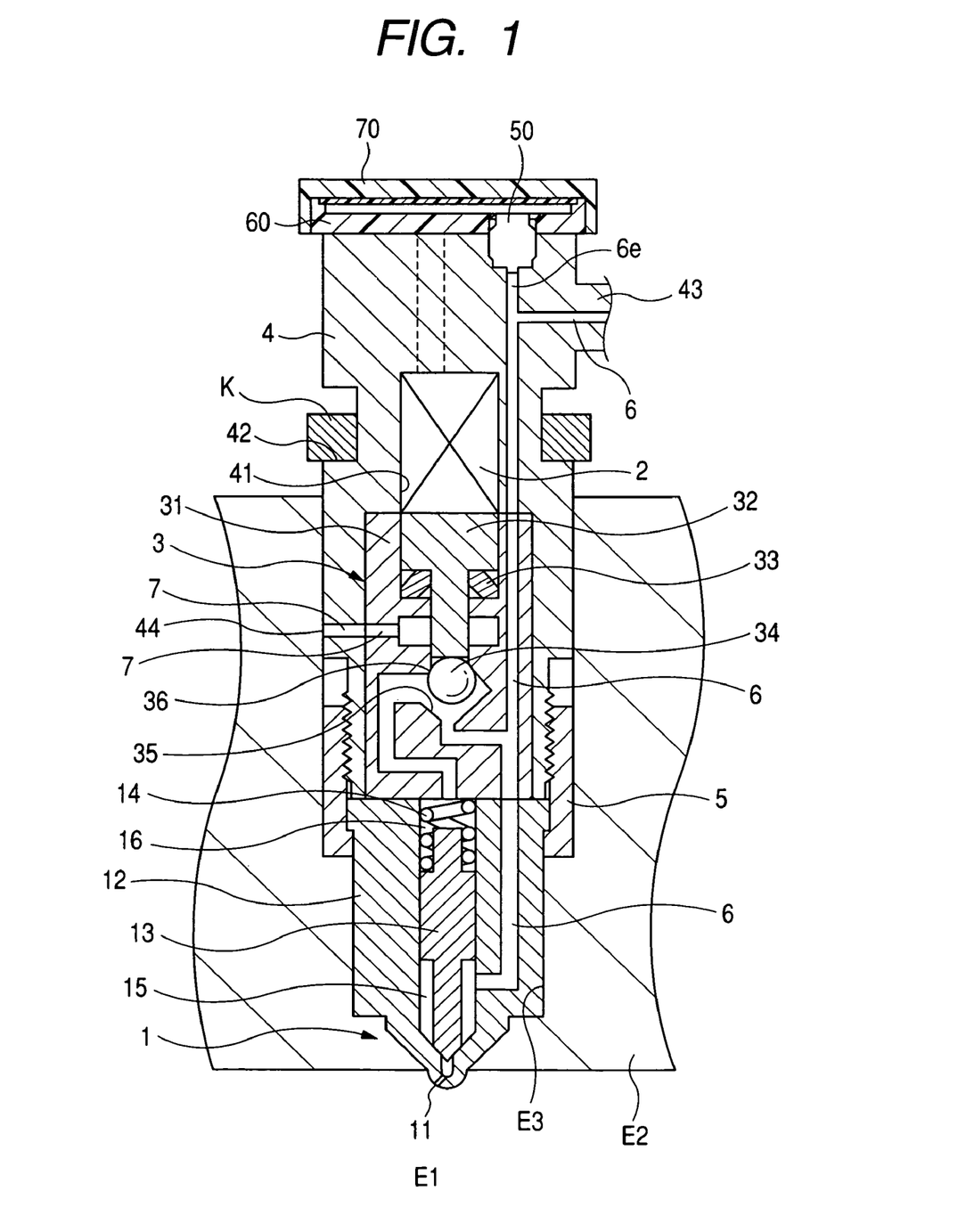
FIG. 1 is a longitudinal sectional view which shows an internal structure of a fuel injector according to the first embodiment of the invention.
Figure 2:
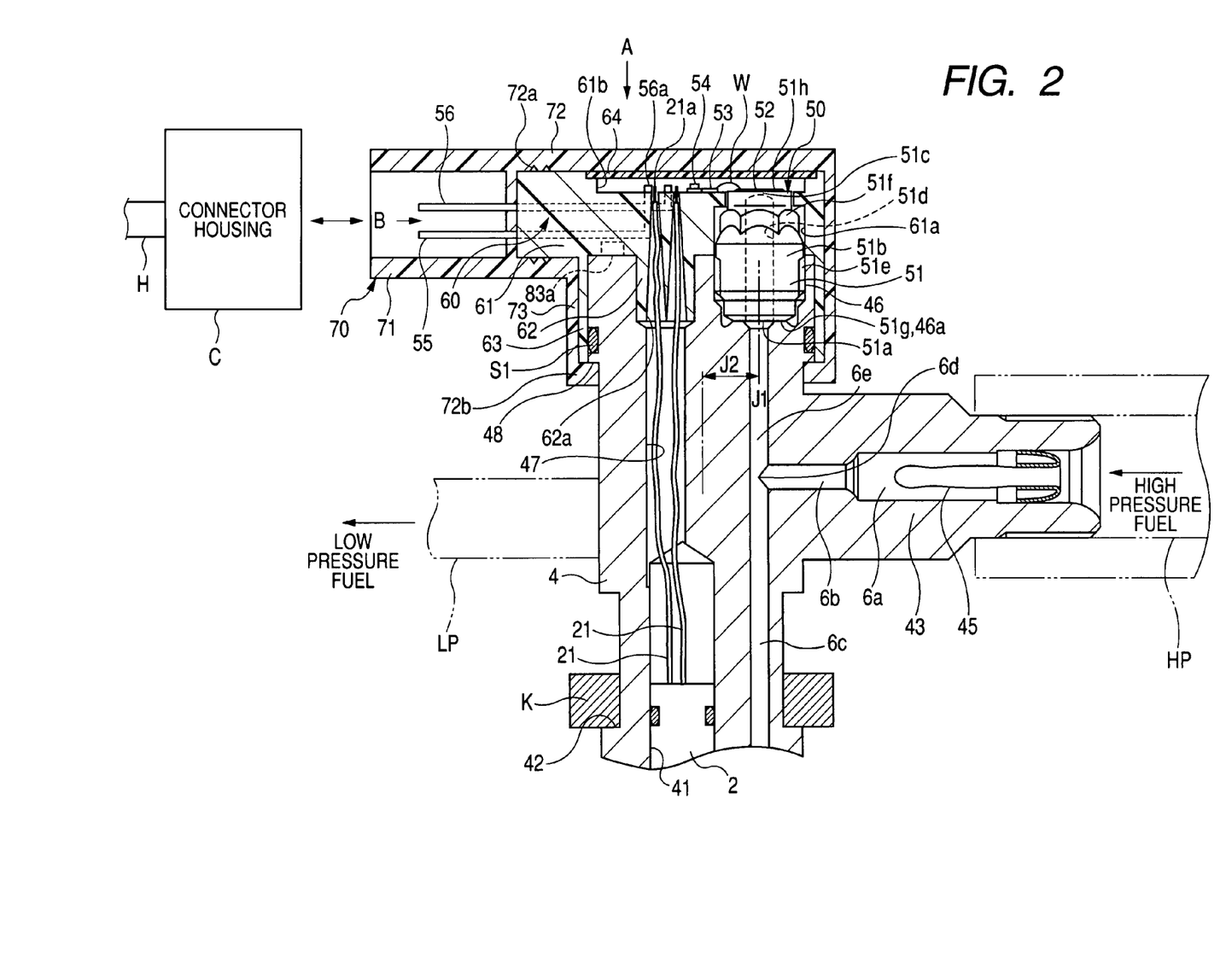
FIG. 2 is a partially enlarged sectional view of FIG. 1.

Referring to the drawings, wherein like reference numbers refer to like parts in several views, particularly to FIGS. 1 and 2, there is shown a fuel injector according to the first embodiment of the invention which will be referred to herein as being used in, for example, automotive common rail fuel injection systems for diesel engines.

The fuel injector works to inject the fuel, as stored in a common rail (not shown) at controlled high pressures, into a combustion chamber E1 in a cylinder of an internal combustion diesel engine. The fuel injector is equipped with a nozzle 1 from which the fuel is sprayed, a piezoelectric actuator 2 which serves as an open/close mechanism and expands when electrically charged and contracts when discharged, and a back-pressure control mechanism 3 which is operated by the piezoelectric actuator 2 to control the back pressure acting on the nozzle 1.

The nozzle 1 is made up of a nozzle body 12 in which a spray hole(s) 11 is formed, a needle 13 which is moved into or out of abutment with an inner seat of the nozzle body 12 to close or open the spray hole 11, and a spring 14 urging the needle 13 in a valve-closing direction to close the spray hole 11.

The piezoelectric actuator 2 includes a piezo stack made up of a plurality of piezoelectric devices. The piezoelectric actuator 2 is a capacitive load which expands when electrically charged and contracts when discharged and functions as an actuator to move the needle 13.

The back-pressure control mechanism 3 includes a valve body 31 within which a piston 32, a disc spring 33, and a ball valve 34 are disposed. The piston 32 is moved following the stroke of the piezoelectric actuator 2. The disc spring 33 urges the piston 32 into constant abutment with the piezoelectric actuator 2. The ball valve 34 is moved by the piston 32. The valve body 31 is illustrated as being made by a one-piece member, but is actually formed by a plurality of blocks.

The fuel injector also includes a cylindrical injector body 4 in which a cylindrical mount chamber 41 is formed which extends along a longitudinal center line of the fuel injector. The mount chamber 41 has an inner shoulder to define a small-diameter housing (i.e., an upper housing, as viewed in FIG. 1) in which the piezoelectric actuator 2 is mounted and a large-diameter housing (i.e., a lower housing, as viewed in FIG. 1) in which the back-pressure control mechanism 3 is mounted. A hollow cylindrical retainer 5 is fit in the injector body 4 in a screw fashion to retain the nozzle 1 within the head of the injector body 4.

The nozzle body 12, the injector body 4, and the valve body 31 have formed therein a high-pressure path 6 through which the fuel is delivered at a controlled high pressure from the common rail to the spray hole 11. The injector body 4 and the valve body 31 have also formed therein a low-pressure path 7 which connects with a fuel tank (not shown). The nozzle body 12, the injector body 4, and the valve body 31 are made of metallic material and to be fit in a mount hole 13 formed in a cylinder head E2 of the engine. The injector body 4 has an outer shoulder 42 with which an end of a clamp K is to engage for securing the fuel injector in the mount hole E3 tightly. Specifically, installation of the fuel injector in the mount hole E3 is achieved by fastening the other end of the clamp K to the cylinder head E2 through a bolt to press the outer shoulder 42 into the mount hole E3.

Between the outer periphery of a top portion of the needle 13 close to the spray hole 11 and the inner periphery of the nozzle body 12, a high-pressure chamber 15 is formed which establishes a fluid communication between the high-pressure path 6 and the spray hole 11 when the needle 13 is lifted up in a valve-opening direction. The high-pressure chamber 15 is supplied with the high-pressure fuel through the high-pressure path 6 at all times. A back-pressure chamber 16 is formed by one of ends of the needle 13 which is opposite the spray hole 11. The spring 14 is disposed within the back-pressure chamber 16 to urge the needle 13 in the valve-closing direction.

The valve body 31 has formed therein a high-pressure seat 35 exposed to a fluid path extending between the high-pressure path 6 and the back-pressure chamber 16. The valve body 31 has also formed therein a low-pressure seat 36 exposed to a path extending between the low-pressure path 7 and the back-pressure chamber 16 in the nozzle 1. The low-pressure seat 36 faces the high-pressure seat 35 to define a valve chamber within which the ball valve 34 is disposed.

The injector body 4 has, as shown in FIGS. 1 and 2, a high-pressure port (i.e., a fuel inlet) 43 to which a high-pressure pipe HP is to be connected and a low-pressure port (i.e., a fuel outlet) 44 to which a low-pressure pipe LP (i.e., a drain pipe) is to be connected. The low-pressure port 44 may be located either below or above the clamp K, in other words, closer to or farther from the spray hole 11 than the claim K, as illustrated in FIG. 1 or 2. Similarly, the high-pressure port 43 may be located wither below or above the clamp K.

The fuel injector of this embodiment is so designed that the fuel is delivered from the common rail to the high-pressure port 43 through the high-pressure pipe HP, in other words, the fuel enters the cylindrical injector body 4 at an outer circumferential wall thereof. The fuel, as having entered the fuel injector, passes through portions 6a and 6b of the high-pressure path 6 within the high-pressure port 43, as clearly illustrated in FIG. 2, which extend perpendicular to the axis (i.e., the longitudinal direction) of the fuel injector, flows through a portion 6c of the high-pressure path 6 extending parallel to the axis of the fuel injector, and then enters the high-pressure chamber 15 and the back-pressure chamber 16.

The high-pressure paths 6c and 6b that are portions of the high-pressure path 6 intersect with each other at substantially right angles to in the form of an elbow. The high-pressure path 6 also includes a branch path 6e which extends from a joint or intersection 6d between the high-pressure paths 6c and 6b away from the spray hole 11 in parallel to the longitudinal axis of the injector body 4. The branch path 6c leads to a fuel pressure sensor 50, as will be described below in detail.

The high-pressure path 6a is greater in diameter than the high-pressure path 6b within the high-pressure port 43. A filter 45 is, as can be seen in FIG. 2, disposed inside the high-pressure path 6a to trap foreign matters contained in the fuel supplied from the common rail.

When the piezoelectric actuator 2 is in a contracted state, the valve 34 is, as illustrated in FIG. 1, urged into abutment with the low-pressure seat 36 to establish the fluid communication between the back-pressure chamber 16 and the high-pressure path 6, so that the high-pressure fuel is supplied to the back-pressure chamber 16. The pressure of the fuel in the back-pressure chamber 16 and the elastic pressure, as produced by the spring 14 act on the needle 13 to urge it in the valve-closing direction to close the spray hole 11.

Alternatively, when the piezoelectric actuator 2 is in an expanded state, the valve 34 is pushed into abutment with the high-pressure seat 35 to establish the fluid communication between the back-pressure chamber 16 and the low-pressure path 7, so that the pressure in the back-pressure chamber 16 drops, thereby causing the needle 13 to be urged by the pressure of fuel in the high-pressure chamber 15 in the valve-opening direction to open the spray hole 11 to spray the fuel into the combustion chamber E1 of the engine.

The spraying of the fuel from the spray hole 11 will result in a variation in pressure of the fuel in the high-pressure path 6. The fuel pressure sensor 50 installed in the injector body 4 works to measure such a fuel pressure variation. An ECU (electronic control unit) of a fuel injection system (not shown) analyses the waveform of the output from the fuel pressure sensor 50 and finds the time when the pressure of the fuel began to drop due to the spraying of the fuel from the spray hole 11 to determine the injection timing of the fuel injector. The ECU also analyzes the waveform of the output and finds the time when the pressure of the fuel began to rise due to the termination of the spraying of the fuel from the spray hole 11 to calculate the end of the injection duration for which the fuel injector is kept opened. The ECU further calculates the amount of drop in pressure of the fuel to determine the quantity of fuel actually sprayed from the fuel injector.

The structure of the fuel pressure sensor 50 and the installation thereof in the injector body 4 will be described below.

The fuel pressure sensor 50 is equipped with a stem 51 working as a pressure deformable member which is sensitive to the pressure of fuel in the branch path 6e to deform elastically and a strain gauge 52 working to convert the elastic deformation or distortion of the stem 51 into an electric signal. The stem 51 is made of metal which needs to have the mechanical strength great enough to withstand the pressure of the fuel in the branch path 6e and a coefficient of thermal expansion low enough to keep adverse effects on the operation of the strain gauge 52 within an allowable range. For example, the stem 51 is preferably formed by machining (cutting) or cold-forging a material made of a mixture of main components of Fe, Ni, and Co or Fe and Ni and additives of Ti, Nb, and Al or Ti and Nb as precipitation strengthening materials.

The stem 51 includes a hollow cylindrical body 51b, as illustrated in FIG. 2, and a circular plate-made diaphragm 51c. The cylindrical body 51b has formed in an end thereof a fuel inlet 51a into which the fuel enters. The diaphragm 51c closes the other end of the cylindrical body 51b. The pressure of the fuel entering the cylindrical body 51b at the inlet 51a is exerted on the diaphragm 51c and an inner wall 51d of the cylindrical body 51b, so that the stem 51 is deformed elastically as a whole.

The cylindrical body 51b and the diaphragm 51c are axial-symmetrical with respect to a longitudinal center line J1 (i.e., an axis), as indicated by a dashed-dotted line in FIG. 2, of the fuel pressure sensor 50 (i.e., the stem 51), so that the stem 51 will deform axisymmetrically when subjected to the pressure of the fuel. The longitudinal center line J1 of the stem 51 is offset from the longitudinal center line J2 of the injector body 4 in parallel thereto. In other words, the fuel pressure sensor 50 is placed in misalignment with the injector body 4 in the longitudinal direction of the fuel injector.

The injector body 4 has formed in the end (i.e., an upper end, as viewed in FIG. 2) thereof a recess or mount chamber 46 in which the cylindrical body 51b of the stem 51 is mounted. The mount chamber 46 has an internal thread formed on an inner peripheral wall thereof. The cylindrical body 51b has an external thread 51e formed on an outer peripheral wall thereof. The installation of the stem 51 in the injector body 4 is achieved by inserting the stem 51 into the mount chamber 46 from outside the injector body 4 along the longitudinal center line J2 and fastening a chamfered surface 51f formed on the outer periphery of the cylindrical body 51b using a tool such as a spanner to engage the external thread 51e of the cylindrical body 51b with the internal thread of the mount chamber 46.

The bottom of the mount chamber 46 of the injector body 4 has an annular sealing surface 46a extending around the circumference of the open end of the inlet 51a. Similarly, the cylindrical body 51b of the stem 51 has formed on the top end (i.e., the lower end, as viewed in FIG. 2) thereof facing the spray hole 11 an annular sealing surface 51g which is to be placed in close abutment with the sealing surface 46a when the fuel pressure sensor 50 is fastened in the mount chamber 46 tightly. Specifically, the tight engagement of the external thread 51e of the cylindrical body 51b with the internal thread of the mount chamber 46 urges the sealing surface 51g of the cylindrical body 51b into constant abutment with the sealing surface 46a of the mount chamber 46 to create a hermetical metal-touch-seal between the injector body 4 and the stem 51. This avoids the leakage of the fuel from the branch path 6e to outside the injector body 4 through a contact between the injector body 4 and the stem 51. Each of the sealing surfaces 46a and 51g extends perpendicular to the longitudinal center line J1 of the stem 51.

The strain gauge 52 is affixed to a mount surface 51h of the diaphragm 51c through an insulating film (not shown). The mount surface 51h is one of opposed outer major surfaces of the diaphragm 51c which is far from the inlet 51a. When the pressure of the fuel enters the cylindrical body 51b, so that the stem 51 elastically expands, the diaphragm 51c will deform. This causes the strain gauge 52 to produce an electrical output as a function of the amount of deformation of the diaphragm 51c. The diaphragm 51c and a portion of the cylindrical body 51b are located outside the mount chamber 46. The diaphragm 51c is disposed on the cylindrical body 51b so as to extend perpendicular to the longitudinal center line J1 of the stem 51.

An insulating substrate 53 is placed flush with the mount surface 51h. On the insulating substrate 53, circuit component parts 54 are fabricated which constitute a voltage applying circuit and an amplifier which are electrically connected to the strain gauge 52 through wires W using wire bonding techniques. The strain gauge 52 forms a bridge circuit along with resistors (not shown). The voltage applying circuit works to apply the voltage to the strain gauge 52. This causes the bridge circuit to change a resistance value thereof as a function of the degree of deformation of the diaphragm 51c, thus resulting in a change in output voltage from the bridge circuit. Specifically, the bridge circuit produces the voltage as indicating the pressure of the fuel in the branch path 6e. The amplifier works to amplify the output from the strain gauge 52 (i.e., the voltage produced by the bridge circuit) and outputs it from one of four sensor terminals 55: one being a sensor output terminal, one being a voltage terminal, one being a circuit control terminal, and one being a ground terminal. Drive terminals 56 extend parallel to the sensor terminal s55 in connection with positive and negative power supply leads 21 extending from the piezoelectric actuator 2. The drive terminals 56 serve to supply electric power (e.g., 160 to 170V) to the piezoelectric actuator 2 to charge it.

The sensor terminals 55 and the drive terminals 56 are united by a mold 60 made of resin (i.e., heat insulator material). The resin mold 60 is made up of a body 61, a boss 62, and a hollow cylindrical wall 63. The body 61 is placed on one of the ends of the cylindrical injector body 4 which is far from the spray hole 11. The boss 62 extends or projects downwardly, as viewed in FIG. 2, from the body 61 toward the spray hole 11. The cylindrical wall 62 extends from the body 61 toward the spray hole 11 around the boss 62.

The body 61 has formed therein a hole 61a within which the fuel pressure sensor 50 is disposed. The mount surface 51h of the diaphragm 51c on which the strain gauge 52 is secured is exposed to an open end of the hole 61a far from the spray hole 11. The insulating substrate 53 is affixed to one of opposed surfaces of the body 61 which is fat from the spray hole 11, so that the mount surface 51h of the diaphragm 51c lies in the same plane as the insulating substrate 53. The strain gauge 52 on the mount surface 51h, the circuit component parts 54, and the insulating substrate 53 are disposed within a mount recess 61b formed in the surface of the body 61. The mount recess 61b is closed by a resinous cover 64.

The boss 62 of the resin mold 60 is fitted in a lead wire hole 47 which is formed in the injector body 4 and through which the power supply leads 21 pass, thereby positioning the resin mold 60 radially of the injector body 4. The boss 62 has formed therein a through hole 62a which extends substantially parallel to the longitudinal center line J2. Ends of the lead wires 21 and ends 56a of the drive terminals 56 are exposed outside the surface of the body 61 which is far from the spray hole 11. Each of the lead wires 21 is welded electrically to one of the ends 56a of the drive terminals 56.

The hollow cylindrical wall 63 extends along the outer periphery of the injector body 4. Specifically, the cylindrical wall 63 is fit on the circumference of the injector body 4. An O-ring S1 is fit in an annular groove formed in the circumference of the injector body 4 to establish a hermetical seal between the injector body 4 and the cylindrical wall 63, which avoids the intrusion of water from outside the injector body 4 to the strain gauge 52 and the lead wires 21 through a contact between the injector body 4 and the resin mold 60. When adhered to the lead wires 21, drops of water may flow along the lead wires 21 to wet the drive terminals 56 and the circuit component parts 54 undesirably.

The sensor terminals 55 and the drive terminals 56 disposed within the resin mold 60 are retained firmly inside a resinous connector housing 70. Specifically, the sensor terminals 55, the drive terminals 56, and the connector housing 70 constitute a sensor electric connector assembly. The connector housing 70 includes a hollow cylindrical extension 71 for establishing a mechanical connection with external lead wires (not shown), a hollow body 72 in which the resin mold 60 is retained, and a hollow cylindrical wall 73 which extends toward the spray hole 11 and is fit on the cylindrical wall 63 of the resin mold 60.

The body 72 and the cylindrical wall 73 are contoured as a whole to conform with the contours of the body 61, the cover 64, and the cylindrical wall 63 of the resin mold 60. The connector housing 70 and the resin mold 60 are assembled together using molding techniques. Specifically, the body 72 has annular ridges 72a which create hermetical seals between the connector housing 70 and the resin mold 60 when the connector housing 70 is molded so as to cover the resin mold 60, as will be described later in detail. The hermetical seals avoid the intrusion of water from outside the injector body 4 into the connector housing 70 through a contact between the inner wall of the cylindrical wall 73 of the connector housing 70 and the outer wall of the cylindrical wall 73 of the resin mold 60 to wet the sensor terminals 55 and the drive terminals 56 exposed inside the cylindrical extension 71 undesirably.

The cylindrical wall 73 of the connector housing 70 has an annular claw 72b which establishes a snap fit on a shoulder 48 formed on the injector body 4, thereby securing the orientation of an assembly of the connector housing 70 and the resin mold 60 to the longitudinal center line J1 of the stem 50.

Assembling of the sensor terminals 55, the drive terminals 56, and the resin mold 60 will be described below with reference to FIGS. 3(a) to 4.

Figure 3A:
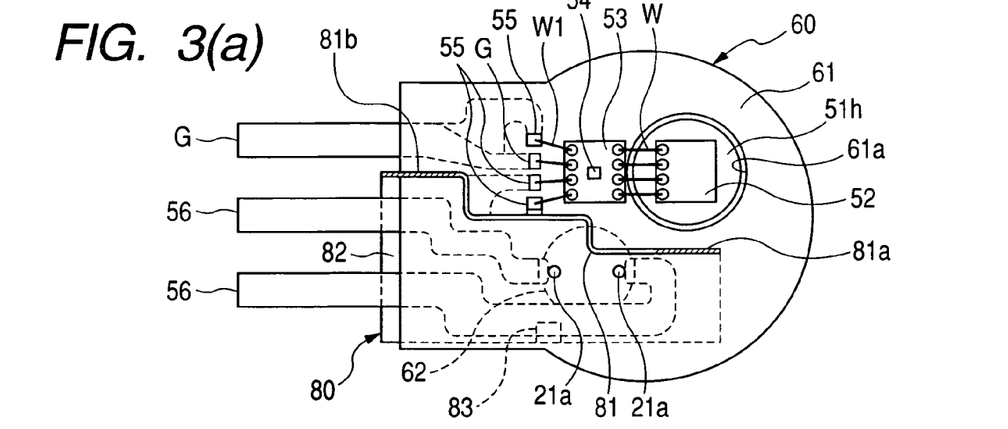
FIGS. 3(a), 3(b), and 3(c) are illustrations, as viewed from an arrow A in FIG. 2.

FIG. 3(a) is an illustration, as viewed from an arrow A in FIG. 2, from which the connector housing 70 and the cover 64 are omitted for the sake of convenience. FIG. 3(b) corresponds to FIG. 3(a) from which the resin mold 60 is omitted FIG. 3(c) corresponds to FIG. 3(b) from which the drive terminals 56 and a ground terminal G, as will be described later in detail, are omitted. FIG. 4 is an illustration, as viewed from an arrow B in FIG. 2, from which the connector housing 70 and the cover 64 are omitted.

The resin mold 60 has retained therein the three sensor terminals 52, the two drive terminals 56 and the one ground terminal G. Within the cylindrical extension 71, a total of the six terminals 55, 56, and G are disposed. The drive terminals 56 and the ground terminal G are, as can be seen from FIG. 4, arranged in the form of an upper array, while the sensor terminals 55 are arranged in the form of a lower array. The ground terminal G overlaps one of the sensor terminals 55, as viewed from the arrow A in FIG. 2, (i.e., in the longitudinal direction of the fuel injector). Similarly, the drive terminals 56 overlap with two of the sensor terminals 55, respectively, as viewed from the arrow A in FIG. 2.

Figure 3B:
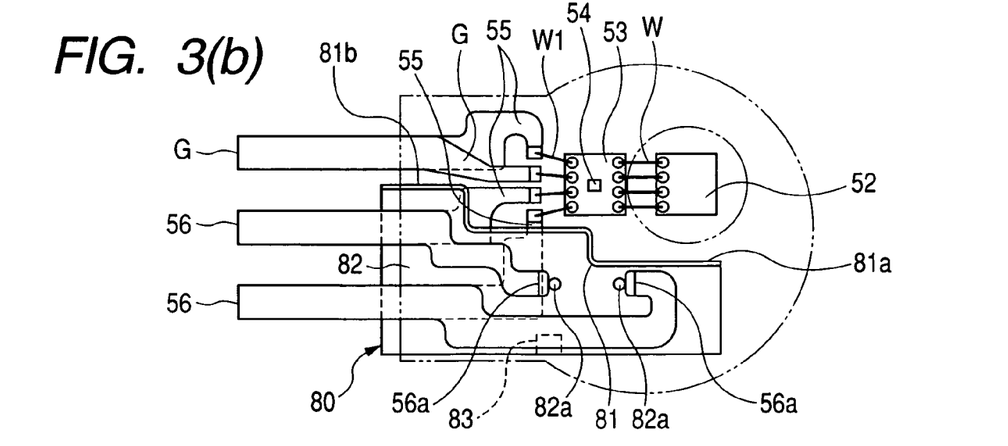
Figure 3C:
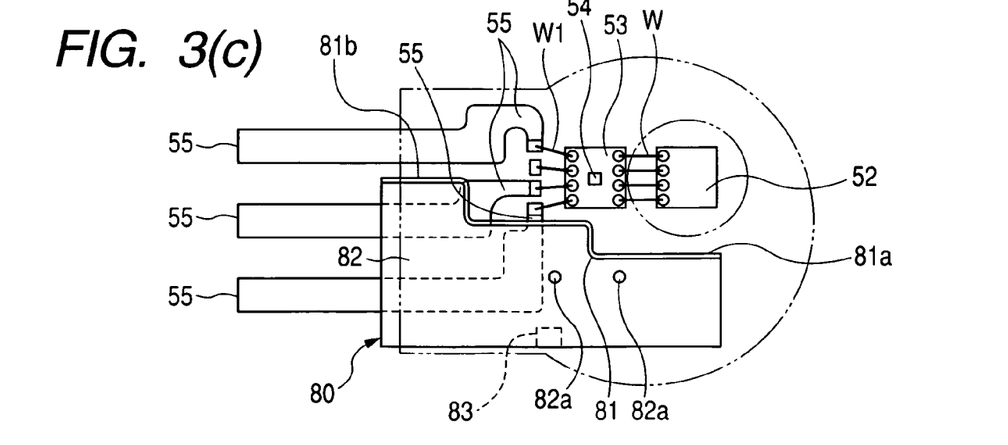

The sensor terminals 55 and the ground terminal G have ends, like the ends 56a of the drive terminals 56, extending outside the body 61 of the resin mold 60 away from the spray hole 11 in electric connection with the voltage applying circuit and the amplifier (i.e., the circuit component parts 54) through the wires W1, as illustrated in FIGS. 3(a) to 3(c). FIG. 4 omits portions of the sensor terminals 55 and the ground terminal G which are exposed outside the body 61 of the resin mold 60 for the brevity of illustration.

A conductive shield 80 is disposed between the circuit component parts 54 and the drive terminals 56 for shielding the circuit component parts 54 from electric noises, as radiated by the drive terminals 56. The conductive shield 80 is united inside the resin mold 60 together with the sensor terminals 55 and the drive terminals 56.

The conductive shield 80 is made up of an upright body 81 extending vertically, a sensor terminal shield 82 extending perpendicular to the longitudinal center line J1 of the fuel pressure sensor 50, and an earth connector 83. The body 81, the sensor terminal shield 82, and the earth connector 83 are formed by a single pressed and bent conductive plate.

The body 81 is located between the drive terminals 56 and the circuit component parts 54 to block the transmission of the electric noises, as radiated by the drive terminals 56, to the circuit component parts 54. The body 81 has an end, as clearly shown in FIG. 4, extending outside the end surface (i.e., the upper end surface, as viewed in FIG. 4) of the resin mold 60. The end of the body 81 is higher than the end 56a of each of the drive terminals 56. The body has the other end (i.e., the lower end, as viewed in FIG. 4) which is closer to the spray hole 11 and lies underneath of the drive terminals 56.

The body 81 has an end portion 81a, as indicted by hatched lines in FIG. 3(a), extending away from the cylindrical extension 71 of the connector housing 70. The end portion 81a is located between the drive terminals 56 and the strain gauge 52 and serves as a sensor device shield. The body 81 also has an end portion 81b, as indicated by hatched lines in FIG. 3(a), extending close to the cylindrical extension 71. The end portion 81b is located between the ground terminal G and the sensor and drive terminals 55 and 56 and serves as a ground terminal shield.

The sensor terminal shield 82 is so shaped as to cover, as viewed from the arrow A in FIG. 2, the whole of portions of the drive terminals 56 which are placed inside the resin mold 60. The sensor terminal shield 82 has through holes 82a formed in a portion thereof facing the boss 62 of the resin mold 60. The lead wires 21 pass through the holes 82a. The sensor terminal shield 82 and the ground terminal shield 81b have ends extending from the resin mold 60 into the cylindrical extension 71 of the connector housing 70.

Figure 4:
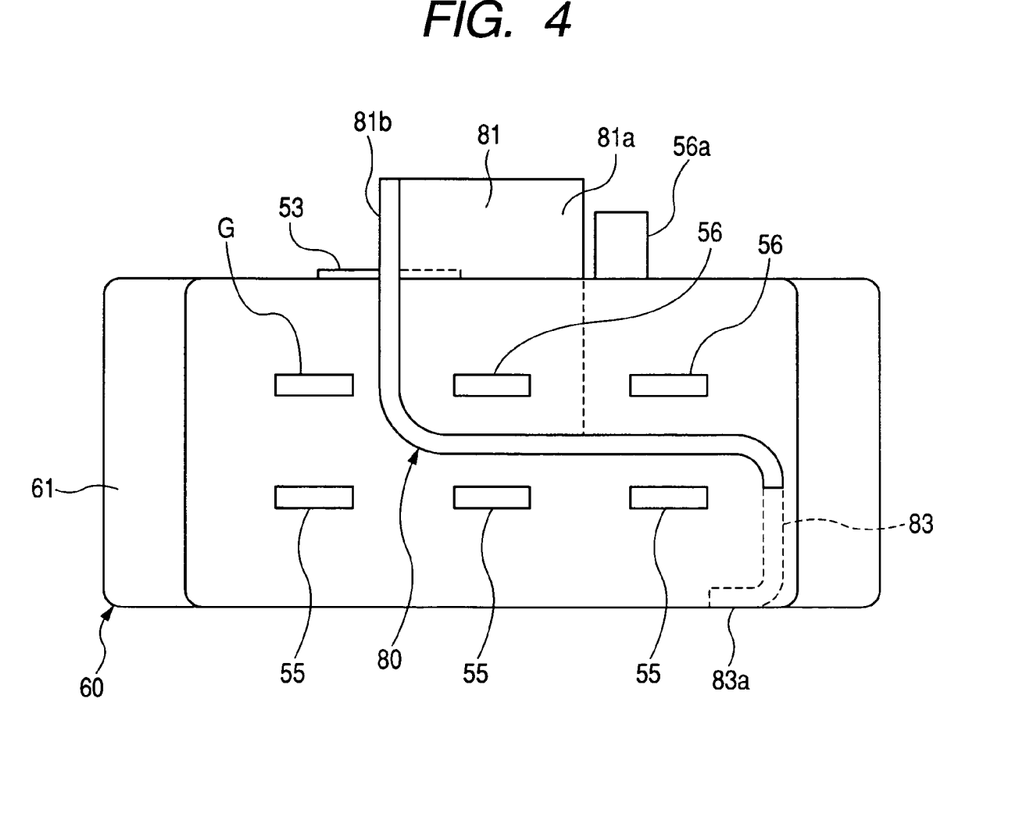
FIG. 4 is a side view, as viewed from an arrow B in FIG. 2.

The earth connector 83, as shown in FIG. 4, extends from the lower end of the sensor terminal shield 82 and has a lower end 83a placed in direct contact with the upper surface of the injector body 4 to ground or earth the conductive shield 80. Specifically, the injector body 4 is fit in the mount hole E3 of the cylinder head E2, thereby connecting the conductive shield 80 to ground through the cylinder head E2.

To the connector housing 70, a connector housing C of a harness H, as illustrated in FIG. 2, is to be joined to establish electric connection with an external device such as an engine electronic control unit (ECU). Specifically, the engine ECU samples the output of the fuel pressure sensor 50 and supplies electric power to the piezoelectric actuator 2 through the harness H.

A sequence of steps of installing the fuel pressure sensor 50 and the connector housing 10 in and on the injector body 4 will be described below.

First, the piezoelectric actuator 2 and the fuel pressure sensor 50 are installed in the mount chambers 41 and 46 of the injector body 4, respectively. The installation of the fuel pressure sensor 50 is, as already described above, achieved by inserting the fuel pressure sensor 50 into the mount chamber 46 parallel to the longitudinal center line J2 of the injector body 4, and turning the chamfered surface 5 if using the clamp K to press the sealing surface 51g of the stem 51 against the sealing surface 46a of the mount chamber 46 of the injector body 4 to establish the metal-touch-seal between the injector body 4 and the stem 51. The sensor terminals 55 and the drive terminals 56 which are united by the resin mold 60 is prepared. The insulating substrate 53 on which the circuit component parts 54 are fabricated is mounted on the resin mold 60.

Next, the resin mold 60 in and on which the sensor output terminal 55, the drive terminals 56, and the insulating substrate 53 are mounted is fitted in the injector body 4 in which the piezoelectric actuator 2 and the fuel pressure sensor 50 are already installed. Specifically, the boss 60 of the resin mold 60 is fitted into the lead wire hole 47. Simultaneously, the lead wires 21 are inserted into the through hole 62a, and the fuel pressure sensor 50 is fitted into the hole 61a of the body 61 of the resin mold 60, so that the mount surface 51h of the diaphragm 51c lies flush with the insulating substrate 53.

Subsequently, the strain gauge 52 placed on the mount surface 51h is joined electrically to lands on the insulating substrate 53 through the wires W using the wire bonding techniques. Each of the ends 21a of the lead wires 21 exposed inside the mount recess 61b is welded to one of the ends 56a of the drive terminals 56. The ends of the sensor terminals 55 and the ground terminal G are welded electrically to the lands on the insulating substrate 53, respectively.

The cover 54 is welded or glued to the resin mold 60 to cover the mount recess 61b hermetically. Finally, the connector housing 70 is formed by resin as to cover the resin mold 60. Specifically, resin is thermally melted over the body 61 of the resin mold 60 to mold the connector housing 70 so that the annular claw 72b is fit on the shoulder 48 of the injector body 48. During such a molding process, the annular ridges 72a formed on the resin mold 60 melt to create the hermetical seals between the connector housing 70 and the resin mold 60. This completes the installation of the fuel pressure sensor 50 and the connector housing 70 in and on the injector body 4.

In the complete assembly of the fuel injector, the resin mold 60 is located between the injector body 4 and the circuit component parts 54 and also between the stem 51 and the circuit component parts 54. In use, the fuel injector is disposed in the mount hole E3 of the cylinder head E2 of the engine, so that it is exposed to a high-temperature of, for example, 140° C., which leads to a concern about the thermal breakage of the circuit component parts 54.

In order to avoid the above problem, the fuel injector of this embodiment is designed to have the resin mold 60 serving as a thermal shield to shield the circuit component parts 54 and the insulating substrate 53 thermally from the metallic injector body 4 and the metallic stem 51, thereby protecting the circuit component parts 54 from the heat transmitted from the combustion chamber E1 of the engine.

The structure of the fuel injector of this embodiment offers the following advantages.

1) The conductive shield 80 is interposed between the drive terminals 56 and the strain gauge 52. The body 81 of the shield 80 works as an electric noise shield to shield the strain gauge 52 from electric noises arising from the drive terminals 56. The sensor device shield 81a is interposed between the drive terminals 56 and the strain gauge 52 and works to shield the strain gauge 52 from the electric noises arising from the drive terminals 56. The ground terminal shield 81b is interposed between the sensor and ground terminal 55 and G and the drive terminals 56 and works to shield the sensor and ground terminals 55 and G from the electric noises arising from the drive terminals 56. Further, the sensor terminal shield 82 is interposed between the drive terminals 56 and the sensor terminals 55 and works to shield the sensor terminal 55 from the electric noises arising from the drive terminals 56.

2) The conductive shield 80 has the earth connector 83 which is placed in abutment with the injector body 4 to connect the conductive shield 80 to the ground (i.e., the earth) through the cylinder head E2. This eliminates the need for an additional separate earth terminal. An additional earth terminal may, however, be installed in the connector housing 70 to connect the conductive shield 80 to the ground instead of the earth connector 83.

3) The conductive shield 80 is united in the resin mold 60 together with the terminals 55, 56, and G, thus facilitating the ease of installing the conductive shield 80 in the fuel injector and resulting in a simplified structure to retain the conductive shield 80 in the connector housing 70.

4) The drive terminals 56 used to supply the electric power to the piezoelectric actuator 2, the sensor terminals 55 used to apply the voltage to and sample the output from the fuel pressure sensor 50, and the ground terminal G are retained within the connector housing 70 to form a single electric connector establishing an electric connection between an external device (e.g., the engine ECU) and the fuel injector. This permits the fuel pressure sensor 50 may be installed in the fuel injector through the single electric connector equipped with the connector housing 70. The harness H extends from the cylindrical extension 71 of the connector housing 70, thus facilitating the handling of the harness H and the ease of joining the harness H to the connector housing 70.

5) The drive terminals 56, the sensor terminals 55) and the ground terminal G are united in the resin mold 60, thus facilitating the ease of joining the wires W to the terminals 55, 56, and G and permitting the arrangement of the terminals 55, 56, and G within the connector housing 70 to be simplified.

6) The O-ring S1 is interposed between the outer periphery of the injector body 4 and the inner periphery of the cylindrical wall 63 of the resin mold 60 to seal the boss 62 of the resin mold 60 through which the lead wires 21 pass and the stem 51 of the fuel pressure sensor 50 hermetically from outside the resin mold 60, thereby blocking the intrusion of water from the boss 62 into the mount recess 61b through the lead wires 21 and from the stem 51 into the mount recess 61b.

7) The fuel pressure sensor 50 is made up of the stain gauge 52 and the stem 51. The stem 51 is fit in the injector body 4. The strain gauge 52 is affixed to the stem 51. The stem 51 is made independently from the injector body 4, thus permitting a loss of propagation of inner stress in the injector body 4 resulting from thermal expansion/contraction to the stem 51 to be increased. Specifically, the stem 51 is made to be separate from the injector body 4, thus reducing the adverse effects of the distortion of the injector body 4 on the stem 51 on which the strain gauge 52 is disposed as compared with when the strain gauge 52 is attached directly to the injector body 4. This results in improved accuracy in measuring a change in pressure of the fuel arising from the spraying of the fuel into the engine.

8) The stem 51 is made to be separate from the injector body 4, thus permitting it to be made of material at low costs whose coefficient of thermal expansion is small. This results in a decrease in thermal distortion of the stem 51 to ensure the accuracy of output from the stain gauge 52.

9) The stern 51 is axisymmetrical in configuration thereof, thus resulting in axisymmetrical deformation thereof when the diaphragm 51c is subjected to the pressure of the fuel, thus causing the diaphragm 51c to deform elastically as a function of the pressure of the fuel exerted thereon accurately. This ensures the accuracy in determining the pressure of the fuel.

10) The diaphragm 51c is located outside the mount recess 46 of the injector body 4, so that it will be insensitive to the thermal distortion of the injector body 4. This results in improved sensitivity of the diaphragm 51c to the pressure of the fuel supplied to the fuel injector.

11) The mount surface 51h on which the strain gauge 52 is mounted is placed flush with the insulating substrate 53 on which the circuit component parts 54 are fabricated, thus facilitating ease of bonding the strain gauge 52 electrically to the circuit component parts 54 through the wires W.

12) The installation of the stem 51 in the injector body 4 is achieved by screwing the stem 51 to establish the engagement of the external thread 51e of the stem 51 with the internal thread of the injector body 4 to urge the sealing surface 51g into constant abutment with the sealing surface 46a of the injector body 4, thereby creating the metal-touch-seal between the stem 51 and the injector body 4 to avoid the intrusion of the fuel thereinto.

Figure 5A:
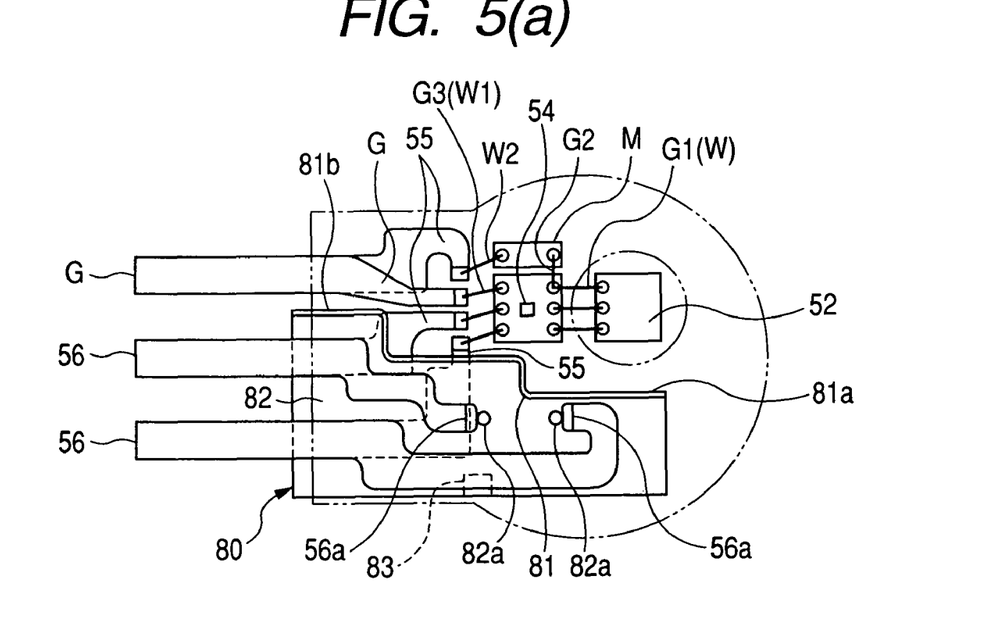
FIGS. 5(a) and 5(b) are top views illustrating a circuit arrangement in a fuel injector according to the second embodiment of the invention.
Figure 5B:
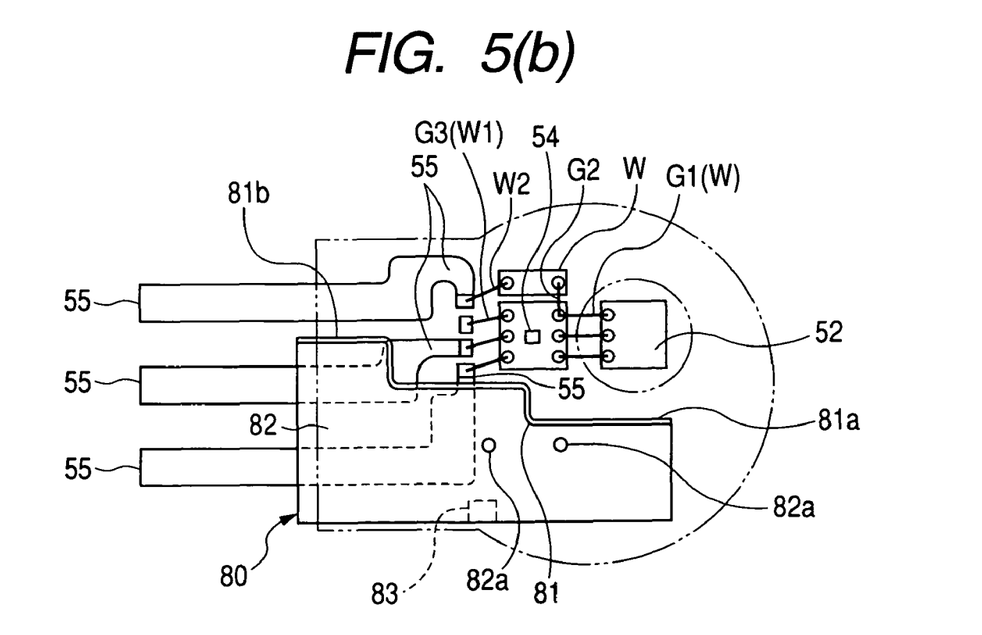

FIGS. 5(a) and 5(b) illustrate a fuel injector according to the second embodiment of the invention which is equipped with a memory chip M in which a correction value is stored to correct an output from the fuel pressure sensors 50. The same reference numbers as employed in the first embodiment will refer to the same parts, and explanation thereof in detail will be omitted here.

Specifically, the correction value, as stored in the memory chip M, is an experimentally derived derivation or difference between an actual value of pressure of fuel and an output from the strain gauge 52 of the fuel pressure sensor 50 when subjected to such pressure of fuel. The engine ECU reads the correction value out of the memory chip M and corrects the output of the strain gauge 52 so as to eliminate the correction value to calculate the pressure of the fuel within the fuel injector.

One of the three sensor terminals 55 is used as a memory terminal through which the correction value is outputted from the memory chip M. Specifically, the connector housing 70 has the two sensor terminals 55, the memory terminal 55, the drive terminals 56, and the ground terminal G retained therein.

FIGS. 5(a) and 5(b) correspond to FIGS. 3(b) and 3(c). The memory terminal 55 is bonded to the memory chip M through the wire W2. The voltage applying circuit and the amplifier (i.e., the circuit component parts 54) have a ground terminal to which ground terminals of the memory chip M and the strain gauge S2 are joined through the wires G1 and G2. Specifically the ground terminal G is shared by the memory chip M and the strain gauge 52.

Figure 6:
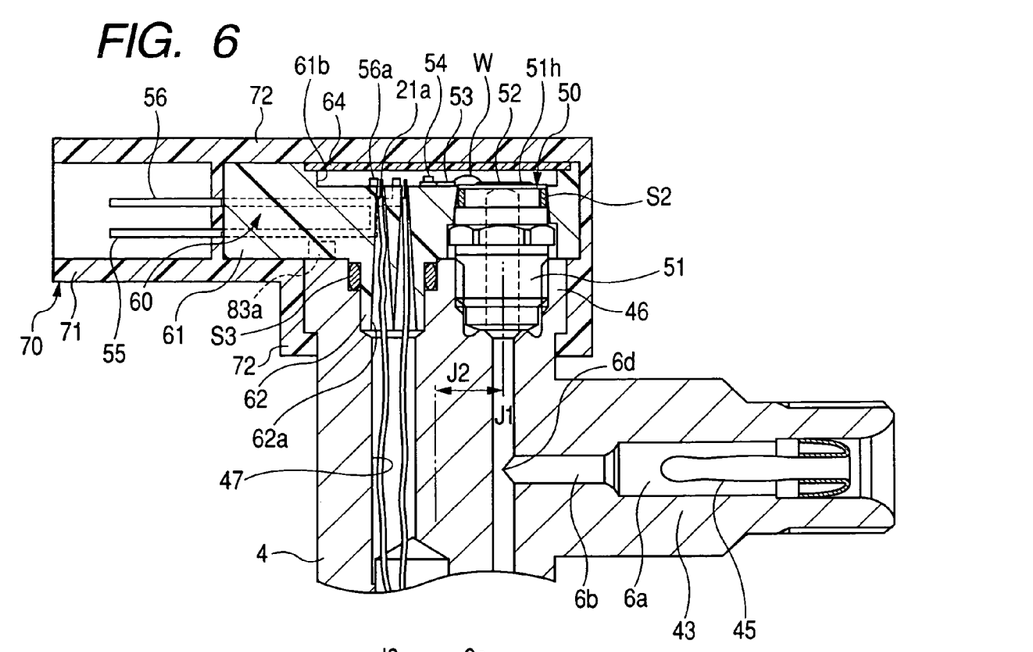
FIG. 6 is a partially enlarged longitudinal sectional view which illustrates a fuel injector according to the third embodiment of the invention.

FIG. 6 illustrates a fuel injector according to the third embodiment of the invention.

The lead wires 21 of the piezoelectric actuator 2 and the fuel pressure sensor 50 are disposed inside the connector housing 70. The fuel injector of the first embodiment is designed to have the O-ring S1 interposed between the cylindrical wall 63 of the resin mold 60 and the injector body 4 to seal the lead wires 21 and the fuel pressure sensor 50 hermetically.

The fuel injector of this embodiment is designed to have O-rings S2 and S3 to hermetically seal the lead wires 21 and the fuel pressure sensor 50. Specifically, the O-ring S2 is interposed between the cylindrical body 51b of the stem 51 of the fuel pressure sensor 50 and the mount chamber 46 of the resin mold 60. The O-ring S3 is interposed between the lead wire hole 47 of the injector body 4 and the boss 62 of the resin mold 60.

Figure 7:
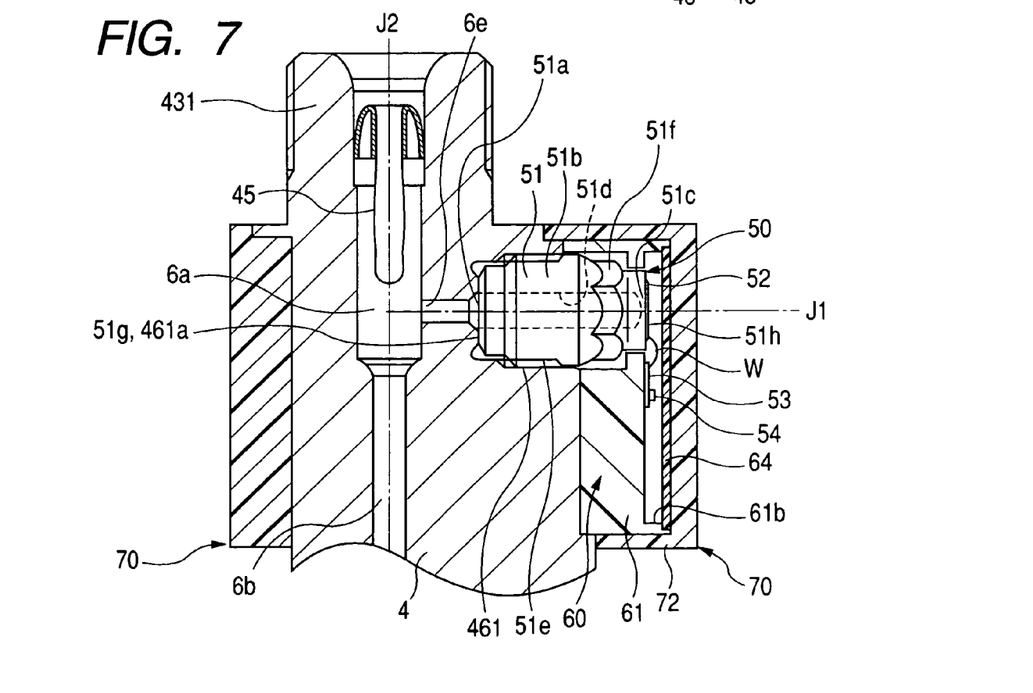
FIG. 7 is a partially enlarged longitudinal sectional view which illustrates a fuel injector according to the fourth embodiment of the invention.

FIG. 7 illustrates a fuel injector according to the fourth embodiment of the invention.

The fuel injector of the first embodiment is so designed that the installation of the fuel pressure sensor 50 is achieved by fitting it into the injector body 4 along the longitudinal center line J2 of the injector body 4. The fuel injector of this embodiment is so designed that the fuel pressure sensor 50 is inserted into the injector body 4 from a radius direction of the injector body 4.

Specifically, the injector body 4 has formed in an outer circumferential wall a mount chamber 461 into which the cylindrical body 51b of the stem 51 of the fuel pressure sensor 50 is to be fitted. The injector body 4 has formed on the inner wall of the mount chamber 461 a sealing surface 461a which extends parallel to the longitudinal center line J2 of the injector body 4 and creates a hermetical metal-touch-seal between itself and the outer wall of the stem 51.

The fuel injector is also designed to have a high-pressure port 431 to which the high-pressure pipe HP is, unlike in the first embodiment, to be joined in the longitudinal center line J2. Specifically, the cylindrical injector body 4 has the high-pressure port 431 extending away from the spray hole 11 in the axial direction of the injector body 4.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

The fuel injector may be designed to have a combination of the features as discussed above.

The conductive shield 80 is made of a conductive plate, but may alternatively be formed by a conductive mesh.

The sensor output terminal 55 and the drive terminals 56 may alternatively be disposed in another resin-molded holder separate from the resin mold 60. The resin-molded holder is preferably retained in the connector housing 70 along with the resin mold 60.

The fuel pressure sensor 50 may alternatively be equipped with a piezoelectric device or another type of pressure sensitive device instead of the strain gauge 52.

The insulating substrate 53 and the strain gauge 52 may alternatively be arrayed to overlap each other along the longitudinal center line J1.

The fuel pressure sensor 50 may alternatively be installed in a portion of the injector body 4 which is retained inside the mount hole E3 of the cylinder head E2. The fuel pressure sensor 50 may also be installed in a portion of the injector body 4 which is closer to the spray hole 11 than the clamp K.

The fuel injector may alternatively be of a solenoid-operated type without use of the piezoelectric actuator 2.

The invention may be used with fuel injectors designed for direct injection gasoline engines in which the fuel is to be directly injected into the combustion chamber E1.

What is claimed is:

1. A fuel injector for an internal combustion engine comprising:
   a body in which a fuel flow path is formed which extends from a fuel inlet to a spray hole;
   an actuator disposed within said body, said actuator working to open the spray hole to spray fuel, as supplied to the fuel flow path through the fuel inlet, to an internal combustion engine;
   a fuel pressure sensor installed in said body, said fuel pressure sensor working to measure a pressure of the fuel in the fuel flow path and produce an electric signal indicative thereof;
   a circuit component serving as an amplifier to amplify the electric signal, as produced by said fuel pressure sensor, to output the amplified electric signal;
   drive terminals connected to said actuator to supply electric power to said actuator; and
   a conductive shield disposed between said drive terminals and said circuit component to shield said circuit component from electric noise arising from said drive terminals.

2. A fuel injector as set forth in claim 1, wherein said body is metallic, and wherein said conductive shield is grounded to said body.

3. A fuel injector as set forth in claim 1, wherein said fuel pressure sensor includes a deformable member and a sensing device, the deformable member deforming elastically when subjected to the pressure of the fuel, the sensing device working to produce the electric signal as a function of an amount of deformation of the deformable member, and wherein said conductive shield is disposed between said drive terminals and said sensor device and includes a sensor device shield working to block the electric noise, as radiated from said drive terminals to the sensor device.

4. A fuel injector as set forth in claim 1, further comprising a sensor terminal connected to said circuit component to output the amplified electric signal, and wherein said conductive shield is disposed between said drive terminals and said sensor terminal and includes a sensor terminal shield working to block the electric noise, as radiated from said drive terminals to the sensor terminal.

5. A fuel injector as set forth in claim 1, wherein said conductive shield and said drive terminals are united by a resin mold.

6. A fuel injector as set forth in claim 1, further comprising a connector housing which retains said drive terminals, and wherein said conductive shield is retained by said connector housing along with the drive terminals.

* * * * *